United States Patent Office 3,456,217
Patented July 15, 1969

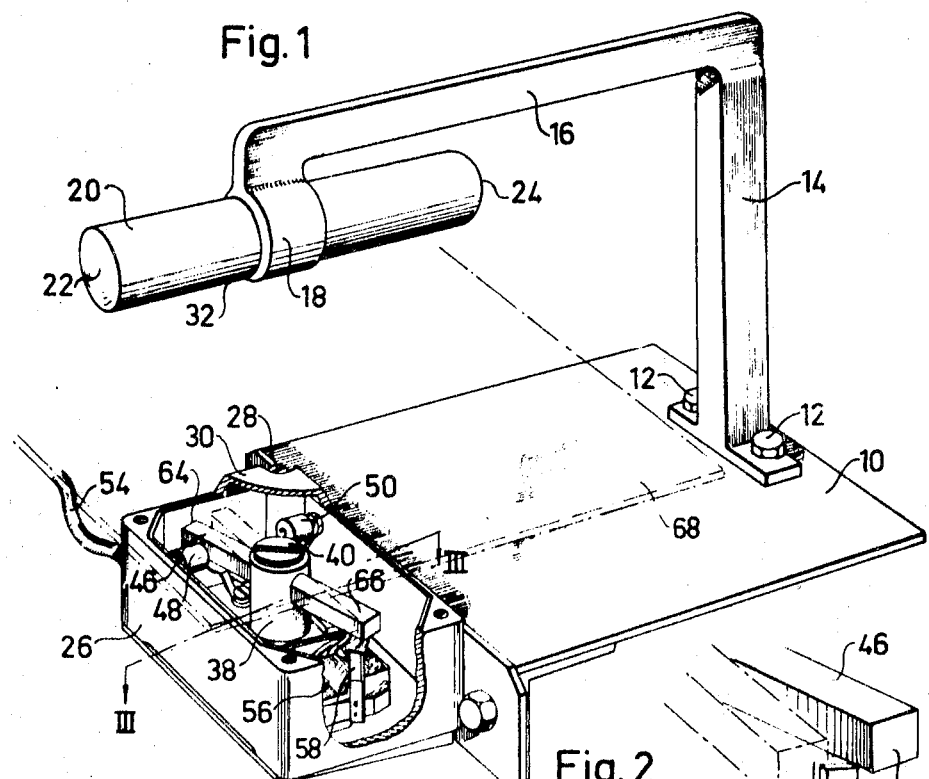
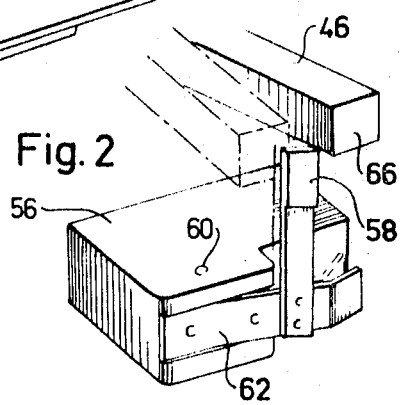
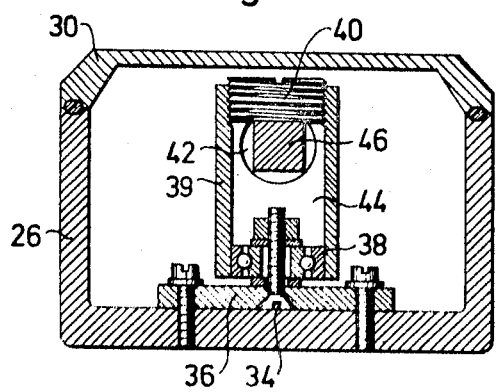

3,456,217
MAGNETICALLY OPERATED SWITCHES
Adolf Gunnar Gustafson, 18 Musseronvagen,
Huddinge, Sweden
Filed Mar. 27, 1967, Ser. No. 626,145
Claims priority, application Sweden, Mar. 28, 1966,
4,109/66
Int. Cl. H01h 9/54
U.S. Cl. 335—207           2 Claims

ABSTRACT OF THE DISCLOSURE

A magnetically operated switch including stationary and movable permanent magnets which generate a magnetic field in the space between the same arranged to receive in such space an object to provide a change of the magnetic field, said movable magnet occupying a first position in the absence of an object and a second position upon the presence of an object in said magnetic field; a control element displaceable by the magnetic field from one of the poles of the movable magnet when the latter is in its second position and which control element operates the switch when displaced, the stationary permanent magnet providing a magnetic field stronger than that of the movable permanent magnet.

---

This invention relates to a system for magnetic operation of switching devices of the type having two co-operating permanent magnets. Such switches, in particular of the limit switch type, have hitherto been constructed so that the impulse for their actuation was generated mechanically. This entailed a rapid wear of the control member or members operable from outside for generation of the impulse causing the switching device to change over.

One main object of the invention is to provide a system for operation of switching devices without any mechanical actuation of the control member of the switching device and thereby to increase considerably the life time of the device.

Another object of the invention is to provide a system for operation of in particular micro-switches which widens the field of utilization for this type of switches. If hitherto the upper range for micro-switches available in the market with regard to current intensity for alternate current of 110 v. has been about 0.5 a., the switches operated by means of the system of this invention suit to current circuits fed with up to 10 or 20 a. at a voltage of 110 A.C.

According to one main feature of the invention the two co-operating permanent magnets are located in spaced relationship in such a manner as by a change of the field of magnetic force between them by measures of non-mechanical character to cause an automatic displacement of one of the magnets in a direction where it is adapted by magnetic force to actuate a movable element in the switching device which in a manner known per se causes the switch to change over.

In a preferred embodiment of the invention the non-displaceable permanent magnet is located at an invariable distance from the displaceable permanent magnet, an unobstructed interspace being provided between said two magnets for contact-free temporary introduction of an object between said two magnets for the purpose of changing of the field of magnetic force between them causing the change-over of the switch. In this embodiment the non-displaceable permanent magnet preferably is considerably stronger than the displaceable permanent magnet.

According to a valuable modification of the invention the stronger permanent magnet is displaceable relative the weaker permanent magnet over a distance of sufficient magnitude to cause so great a change of the field of magnetic force between the permanent magnets as to cause the changing over of the switch.

Preferably, the weaker magnet is reversibly rotatable within limits constituting two positions of actuation of the switch, viz. one position where it due to the weakening or total disappearing of the field of magnetic force between the two rod-shaped permanent magnets is displaced by 90 degrees in relation to the other permanent magnet and by its own magnet force attracts and thereby actuates the movable element of the switch, and another position where the intensity of the field of magnetic force has driven the rotatable magnet from its first-mentioned position against a permanent stop where its own magnetic force has become insufficient to attract said movable element.

Further objects and advantages of the invention will become apparent from the following description, considered in connection with the accompanying drawing, in which:

FIG. 1 is a perspective view of a device for operating a switching device by means of the system according to the invention, some parts of the device being assumed broken away for improved clarity.

FIG. 2 is a perspective view of part of the device shown in FIG. 1 presented in a greater scale.

FIG. 3 is a verical sectional view through the device following line III—III in FIG. 1.

Referring to the drawing, reference numeral 10 denotes a base piece with a bracket 14 secured thereon by means of screws 12. The projecting arm 16 of said bracket 14 carries in an angular socket 18 a rod-shaped permanent magnet 20 the north-magnetic pole of which is assumed to be located at the one end 22 of the rod and the south-magnetic pole on the other end 24. A preferably rectangular box 26 of non-magnetic material is rigidly secured to the base piece 10 in spaced open relationship to, and below the permanent magnet 20. A cover 30 is hermetically secured onto the box 26 by means of screws 28. The box 26 is attached to the base piece 10 so that its longitudinal sides extend transversely to the longitudinal axis of the arm 16 and the permanent magnet 20 and further so that its center 34 is positioned straightly below the center point of the lowermost line 32 along the cylindrical outer surface of the permanent magnet 20. Mounted rotatably about this center 34 (see FIG. 3) by means of an encased ball-bearing 38 is an easily rotatable casing 39 which through an upper screw lock 40 supports a permanent magnet 46 mounted in a groove 42 formed in an interior wall 44 of the casing. In the embodiment shown this permanent magnet 46 has the form of a rod having square-shaped cross-section and is within limits reversibly rotatable between two stops 48 and 50, respectively, disposed on two opposed inner side walls of the casing 26. One front edge of the casing has an opening for passage of a cable 54 which encases the wires of the current circuits the reconnection of which is to be effected by means of a switch 56 placed adjacent the inner surface of the opposed front wall of the casing. This switch is of a structure known per se and may preferably be of the micro-switch type. For its operation said switch 56 is provided with a movable element 58 supported by an arm 62 which in turn is pivotably mounted on a shaft 60 provided in the interior of the switch 56. Said movable element 58 is adapted together with its supporting arm 62 to take one or the other of two positions of which one is indicated with full lines and the other with dash and dotted lines.

In the starting position shown in FIGS. 1 and 2 the south magnetic pole of the permanent magnet 46 is assumed to be located at the end 64 and the north magnetic pole at the end 66. The permanent magnet 22 which is the stronger one, then tends by the magnetic field of magnetic force emanating therefrom to part-rotate the permanent magnet 46 to take a parallel position. This movement has, however, been stopped by the stop 48. If now an object 68 made of or containing magnetically leading material is introduced into the interspace or gap between the two permanent magnets 20 and 46 it will due to its nature without any mechanical contact with the switching device cause a change in the magnetic force which hitherto kept the permanent magnet 46 in abutment against the stop 48. As this field of magnetic force is reduced or even brought to disappear totally, the magnetic force inherent to the magnet 46 is now capable of acting on the movable element 58 made also of magnetically leading material. As a consequence the permanent magnet 46 is rotated over an angle of 90° to the longitudinal axis of the permanent magnet 20 where the north-magnetic pole 66 of the permanent magnet 46 approaches the movable element 58. This latter is attracted by the permanent magnet 46 and takes the other limit position indicated by the dash and dotted lines. This movement of the element 58 results in a manner known per se in that the switch 56 effects a predetermined reconnection of the circuits connected to the switch by the wires encased in the cable 54.

In the embodiment illustrated in the drawing the stops 48 and 50 are made of some resilient material such as rubber, for example. In some cases it may, however, be suitable to make the stops of some permanently magnetic material in order to facilitate the return of the permanent magnet 46 to its position indicated by the dash and dotted ilnes. Such an arrangement is a condition of a potentiometer mounted coaxially with the axis of rotation of the magnet 46 is used as switching means.

As soon as the object 68 has been withdrawn from the interspace between the permanent magnets 20 and 46, the strong field of magnetic force between these two magnets is restored and causes the permanent magnet 46 to be part-rotated back from its position indicated by the dash and dotted lines to the position shown by the full lines in which it abuts against the stop 48. The spacing between the south-magnetic pole 66 of the rotatable magnet 46 and the movable element 58 of the switch 56 will now become so great that the force of the permanent magnet 46 is no longer capable of keeping the movable element 58 attracted.

This element 58 is therefore returned by a spring member forming part of the switch but not shown in the drawing to the position shown by the full lines. This return movement results in a reconnection of the current circuits enclosed in the cable 54 to the starting position. This position is kept until introduction of an object 68 of magnetically leading material again causes a change in the field of magnetic force between the permanent magnets 20 and 46 and thus the whole cycle of operation is repeated.

The absence of any mechanical parts for the operation of the movable element 58 results in that the life of a switching device constructed in accordance with the system of the present invention is considerably increased when compared with the life of known switches in which the movable control element is actuated in a mechanical way. Since a mechanical actuation can only be effected by the same forces it has earlier been impossible to use switches for reconnections in a magnetic way. The interspace or gap between the permanent magnets 20 and 46 can be made considerably greater than in systems for circuit changing by magnetic means known hitherto.

While one or more less specific embodiment of the invention has been shown and described, it is to be understood that this is for purpose of illustration only, and that the invention is not to be limited thereby, but its scope is to be determined by the appended claims.

Since the rotatable magnet 46 is mounted centrally by means of an encased ball-bearing within the closed box 26 the system may be placed in any desired position which means that it is not necessary to support the magnet 46 vertically as shown in the drawing.

As already mentioned, the box 26 is made of a nonmagnetic material and in addition dimensioned in relation to the size of the magnet 46 so that this magnet can not be influenced by magnetically leading material possibly present adjacent or below the box.

The change of the magnetic field between the permanent magnets 20 and 46 can also be brought about by arranging the strong permanent magnet 20 displaceable relatively to the weaker permanent magnet 46. If the magnet 20 is removed for a sufficiently long distance from the magnet 46 the field of magnetic force between the said magnets is weakened so much that the own magnetic force of the rotatable magnet 46 brings its one pole 66 nearer the movable element 58 of the switch so that said element is attracted and the switch performs a predetermined circuit change. When the permanent magnet 20 again is approached to the rotatable magnet 46 this latter is again rotated away from the movable element 58 against the stop 48 which again causes the other predetermined circuit-change.

It is also possible to realize the system according to the invention by making the box 26 with the rotatable permanent magnet 46 and the switch 56 located therein displaceable relatively to a stationary permanent magnet 20.

Among the fields of application for the system according to the invention may be mentioned transport and conveyor plants, in particular when the direction of movement of objects advance in the transport device shall be changed or reversed. Another field of application is the emission from vehicles of impulses causing opening or closing of garage doors, in particular overhead doors. Still another field of application is indication of predetermined levels for liquids supplied to vessels.

The system according to the invention is particularly adapted for use in spaces where the danger of explosions exists, because no sparks can be formed within the space. the switch 56 is encased in the hermetically closed box 26.

What I claim is:

1. A magnetically operated switch provided with switch contacts mechanically operated by a switching member, said switch including a first stationary permanent magnet and a second movable permanent magnet having a first and a second magnetic pole, the two magnets generating a first magnetic field in a space between the magnets, said space being arranged to receive an object providing a change of the magnetic field, which second movable magnet in absence of any object in the space and in dependence on the unchanged magnetic field occupies a first position and a second position in dependence on the magnetic field altered by an object in the space, a control element displaceable by the magnetic field from one of the magnetic poles of the movable magnet when said movable magnet occupies its second position and which control element is fixed on said switching member to move the latter to contact switching position when displaced.

2. A switch according to claim 1 wherein the stationary permanent magnet generates a magnetic field considerably stronger than the moveable permanent magnet.

References Cited

UNITED STATES PATENTS 2,681,960 6/1954 Ellison _____ 335—205 X
3,009,033 11/1961 Werts _____ 335—207

BERNARD A. GILHEANY, Primary Examiner

R. N. ENVALL, Jr., Assistant Examiner